United States Patent [19]

Orii et al.

[11] Patent Number: 4,473,974
[45] Date of Patent: Oct. 2, 1984

[54] STORAGE TANK AND METHOD FOR MANUFACTURING THE SAME

[75] Inventors: Shoichi Orii, Kawasaki; Yoshiaki Shiota, Yokohama, all of Japan

[73] Assignee: Tokyo Shibaura Denki Kabushiki Kaisha, Kawasaki, Japan

[21] Appl. No.: 276,874

[22] Filed: Jun. 24, 1981

[30] Foreign Application Priority Data

Jun. 30, 1980 [JP] Japan .................. 55-88810

[51] Int. Cl.³ .................. E02D 29/00; G21C 17/10
[52] U.S. Cl. .................. 52/21; 52/169.6; 376/250
[58] Field of Search .............. 52/250, 169.6; 376/250

[56] References Cited

U.S. PATENT DOCUMENTS

| | | | |
|---|---|---|---|
| 1,958,487 | 5/1934 | Moran | 52/169.6 |
| 3,288,998 | 11/1966 | Press, Jr. | 376/250 |
| 4,076,585 | 2/1978 | Cachera | 376/250 |
| 4,178,729 | 12/1979 | Jennings | 376/250 |
| 4,321,110 | 3/1982 | Nickel et al. | 376/250 |
| 4,332,170 | 6/1982 | Belval et al. | 376/250 |

FOREIGN PATENT DOCUMENTS 56-3494  1/1981  Japan .................. 376/250

Primary Examiner—John E. Murtagh
Assistant Examiner—Michael Safavi
Attorney, Agent, or Firm—Oblon, Fisher, Spivak, McClelland & Maier

[57] ABSTRACT

The invention provides a storage tank comprising a storage tank main body of concrete; lining plates lined on inner surfaces of a bottom, side walls, and a ceiling of the storage tank main body; and a manhole of the ceiling which is air- and liquid-tight and which blocks radiation. Leakage detection ditches are formed within welded seams of the lining plates. A method for manufacturing such a storage tank is also provided.

2 Claims, 10 Drawing Figures

STORAGE TANK AND METHOD FOR MANUFACTURING THE SAME

BACKGROUND OF THE INVENTION

The present invention relates to a storage tank and, more particularly, to a storage tank for storing a radioactive substance or the like at a nuclear power plant or the like, as well as to a method for manufacturing the same.

In general, radioactive waste produced at a nuclear power plant or the like is stored in a storage tank to attenuate radiation. As a storage tank of this type, a so-called lined storage tank is used wherein the inner surface of a storage tank main body of concrete having the ability to block radiation is lined with lining plates such as stainless steel plates. A lined storage tank of this type is conventionally constructed in the manner as shown in FIG. 1. Referring to this figure, symbol A denotes a storage tank main body of concrete which has sufficient thickness to block radiation and which is integrally formed with a building facility of the nuclear power plant. Lining plates B such as stainless steel plates are lined on the inner wall of the storage main body A to a position slightly above the upper limit of the fluid level of the radioactive waste. An inlet pipe C and an outlet pipe D are connected to the storage tank through the storage tank main body A and the lining plates B so that the radioactive waste is introduced inside the storage tank from the inlet pipe C and is taken out via the outlet pipe D. A number of support members E project from the inner wall of the storage tank main body A at the upper edges of the lining plates B. A separation wall F is mounted on these support members E. This separation wall F is made of reinforced concrete and is capable of blocking radiation. This separation wall F separates the interior of the storage tank into two compartments. Symbol G denotes a manhole. Main parts of the equipment in the storage tank, such as measuring equipment H and a storage tank interior agitating pump I, extend through the upper separation wall F and are arranged thereon. A manhole J is arranged at the ceiling portion of the storage tank main body A. An operator K descends from this manhole J onto the separation wall F for performing maintenance and inspection of the measuring equipment H and the storage tank interior agitating pump I. The recent trend in nuclear plants is toward bigger capacity. With such a trend, the amount of radioactive waste increases and the capacity of storage tanks to store it must also be increased. However, with the storage tank of the construction as described above, the upper space separated by the separation wall F cannot be utilized as space for storing the radioactive waste, thus limiting the capacity of the storage tank. Especially in the case of a nuclear reactor, the building cannot be made very big due to earthquake design standards, so that the size of the storage tank is also limited. In order to solve this problem, it has been proposed to store as much radioactive waste material as possible inside the storage tank by storing together solid waste L and liquid waste M as shown in FIG. 1. However, even with this measure, the amount of waste material which can be stored is still limited and an improvement in the volume efficiency of the storage tank itself has been desired.

SUMMARY OF THE INVENTION

The present invention has been made in view of this and has for its object to provide a storage tank which has a high volume efficiency and storage capacity, and a method for manufacturing such a storage tank.

According to an aspect of the present invention, there is provided a storage tank comprising a storage tank main body of concrete; lining plates covering the inside surfaces of a bottom, side walls, and a ceiling of the storage tank main body; and a manhole formed at the ceiling of the storage tank main body, which has excellent air- and liquid-tightness and radiation blocking property. Leakage detection ditches are formed inside welded seams of the lining plates.

According to another aspect of the present invention, there is also provided a method for manufacturing a storage tank comprising the steps of: constructing a formwork for forming a storage tank main body of concrete; arranging lining plates on the inner wall of the formwork to constitute the inner wall of the storage tank main body; filling concrete inside the formwork to form the storage tank main body; and welding the lining plates to connect them. In accordance with the storage tank of the present invention, there is no need to dispose a separation wall at the upper part of the storage tank. Therefore, it is possible to store radioactive waste close to the ceiling so that the volume efficiency may be improved and a larger amount of waste material may be stored.

According to a method of the present invention, a storage tank of this type may be manufactured in a simpler manner, and a ceiling which is particularly required to be resistant in the direction of the peeling off of the lining plates and which is particularly difficult to manufacture may be more easily manufactured.

BRIEF DESCRIPTION OF THE DRAWINGS

FIGS. 2 to 8 show a storage tank according to an embodiment of the present invention, wherein FIG. 2 is a longitudinal section view illustrating the overall structure of the storage tank, FIG. 3 is a longitudinal sectional view illustrating the mounting structure of lining plates, FIG. 4 is a longitudinal sectional view illustrating a connecting structure of the lining plates at the side walls and the ceiling, FIG. 5 is a longitudinal sectional view illustrating a modification of FIG. 4, FIG. 6 is a sectional view illustrating the structure of a welded seam of the lining plates, and FIGS. 7 and 8 are sectional views illustrating modifications of FIG. 6; and FIGS. 9 and 10 show a storage tank according to a second embodiment of the present invention, wherein FIG. 9 is a longitudinal sectional view illustrating a mounting structure of the lining plates and FIG. 10 is a longitudinal sectional view illustrating a connecting structure of the lining plates at the side walls and the ceiling.

DETAILED DESCRIPTION OF THE PREFERRED EMBODIMENTS

Figure 1:
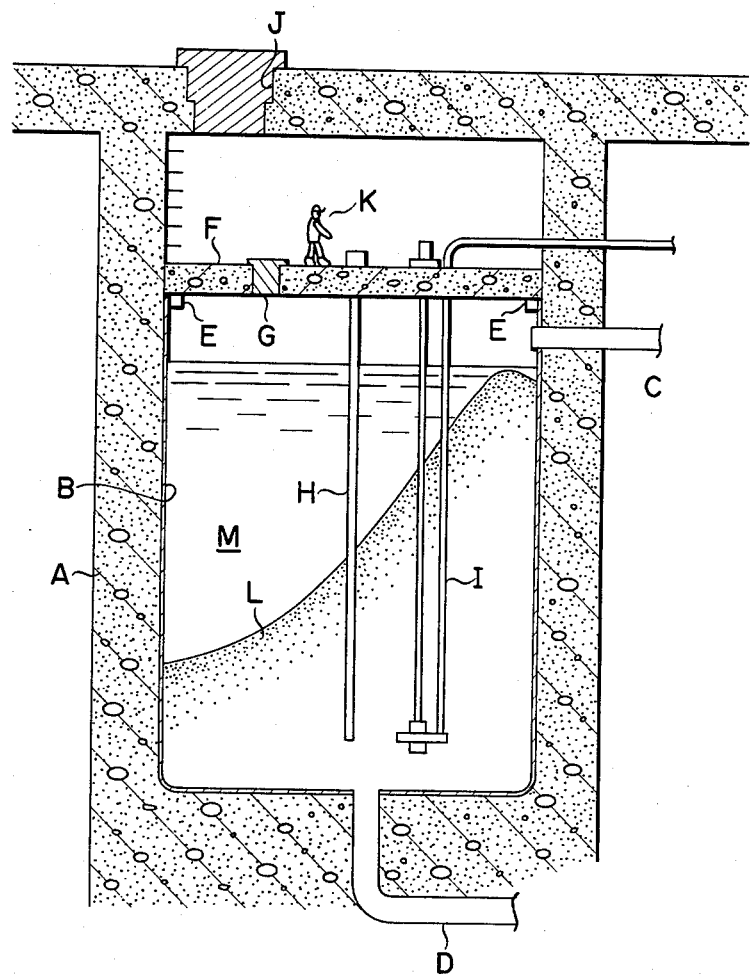
FIG. 1 is a longitudinal sectional view of a conventional storage tank.
Figure 2:
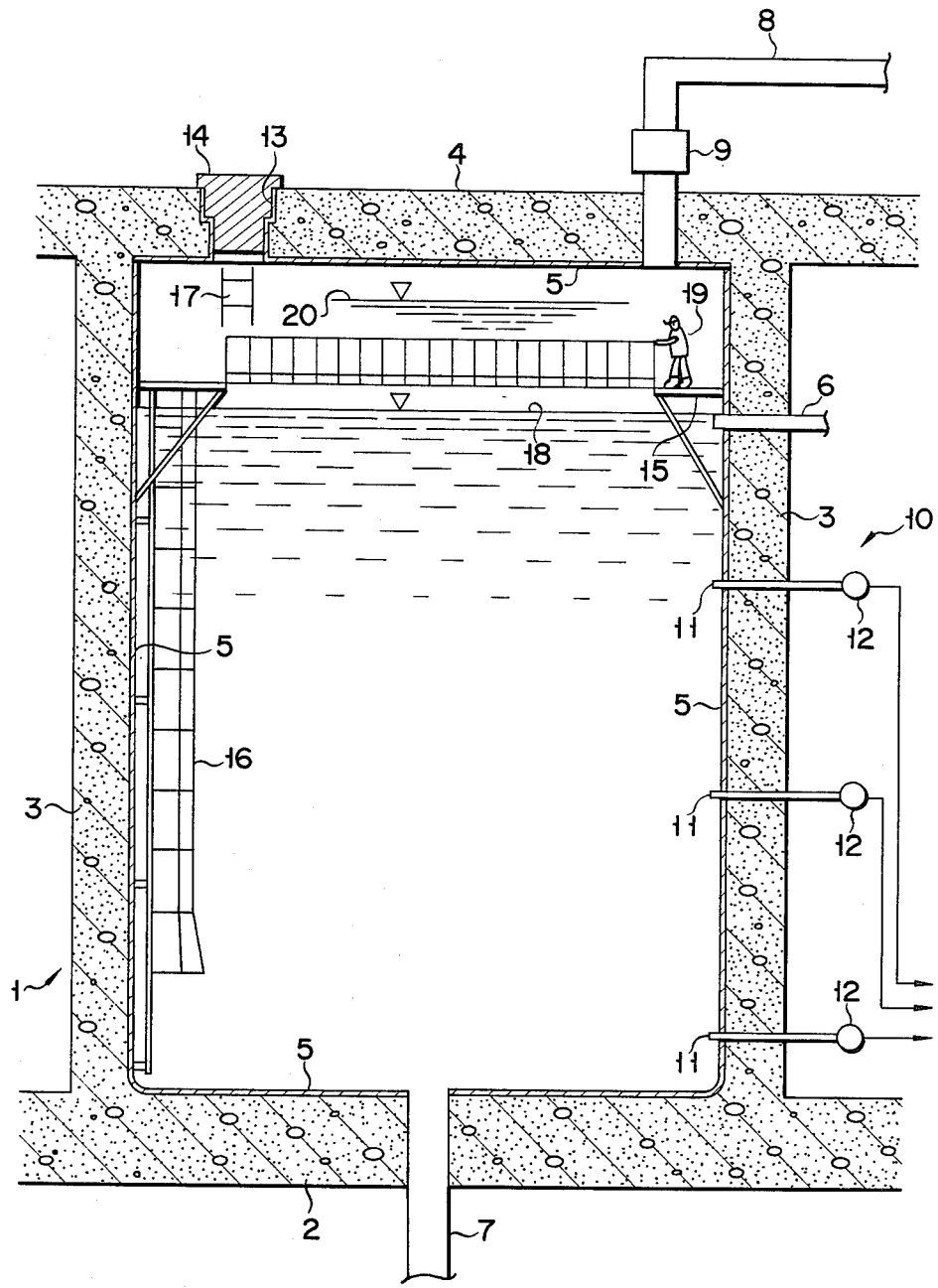

The preferred embodiments of the present invention will now be described with reference to the accompanying drawings.

The storage tank according to the first embodiment of the present invention will first be described referring to FIGS. 2 to 8. The storage tank according to the first embodiment stores condensate of a nuclear power plant. Referring to these figures, reference numeral 1 denotes a storage tank main body of concrete. This storage tank main body 1 is of rectangular parallelepiped shape, for maximizing the volume efficiency and is integrally formed with the building. The storage tank main body 1 comprises a bottom 2, side walls 3 and a ceiling 4, each of which has a thickness sufficient to block radiation. Lining plates 5 such as stainless steel plates line the inside of the entire surface of the bottom 2, the side walls 3 and the ceiling 4 to achieve complete air- and liquid-tightness. An inlet pipe 6 of condensate extends through the side wall 3 and the lining plate 5 to the upper part of the storage tank main body 1. An outlet pipe 7 of condensate extends through the bottom 2 and the lining plate 5 to the lower part of the storage tank main body 1. The condensate flows through the inlet pipe 6 into the tank to be stored therein and is discharged through the outlet pipe 7. A vent pipe 8 is also connected to the upper part of the storage tank main body 1 and this vent pipe 8 is connected to ventilation equipment (not shown). A decontaminating filter 9 for adsorbing radioactive vapor or the like is arranged in the vent pipe 8. Reference numeral 10 denotes a water level detection mechanism which comprises a detection nozzle 11 and a differential photoelectrographic detector 12. The water level detection mechanism 10 detects the water level inside the storage tank. A manhole 13 and a lid 14 covering this are arranged at the ceiling 4 of the storage tank main body 1.

Figure 3:
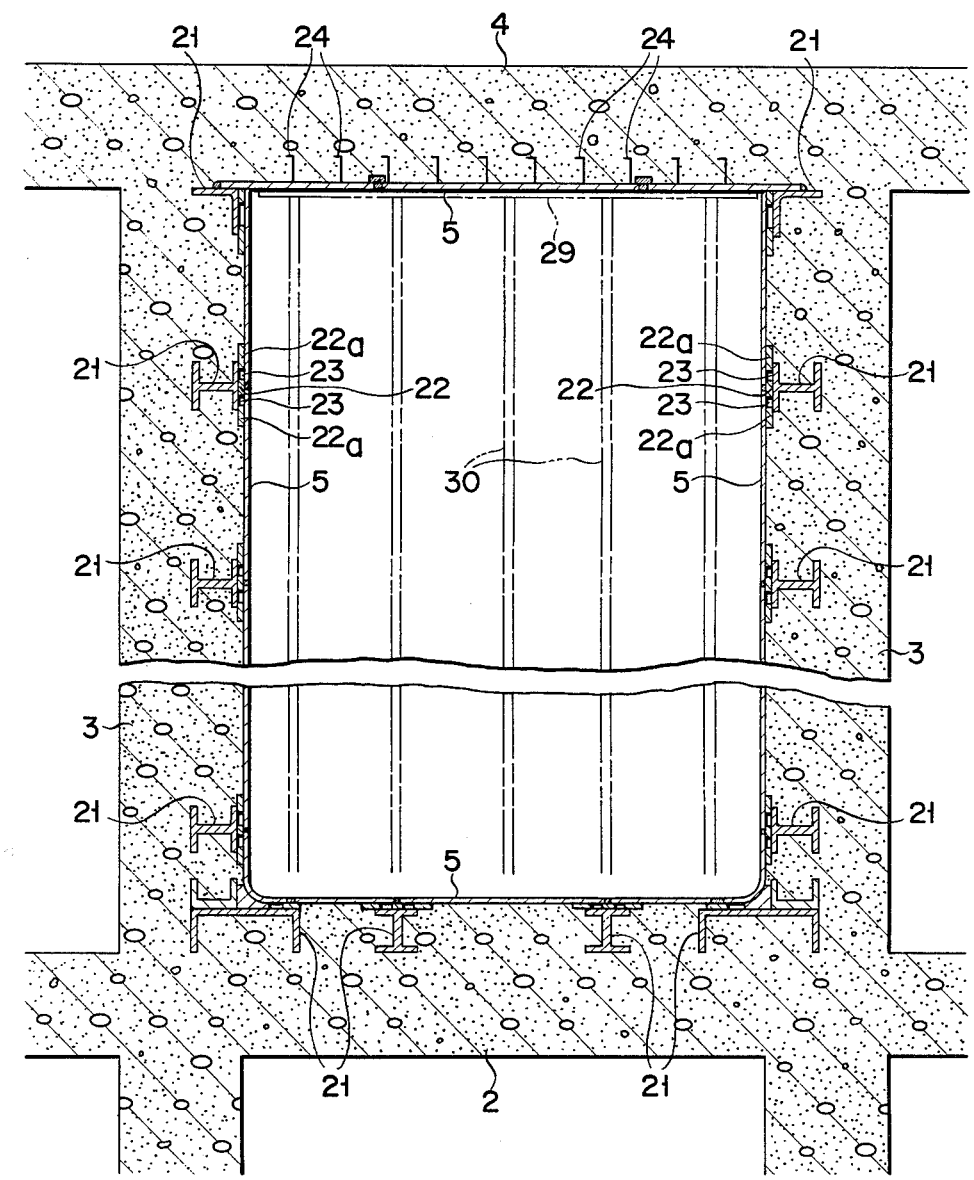
Figure 4:
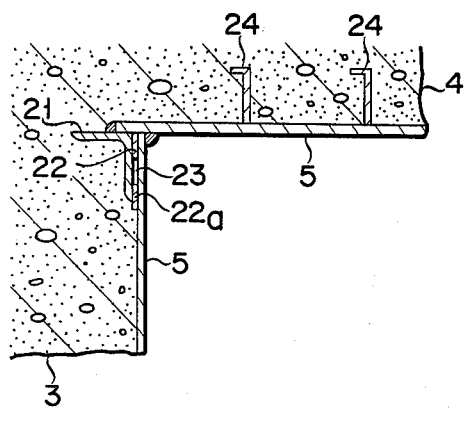
Figure 5:
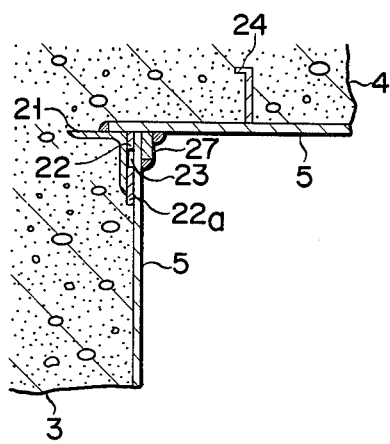
Figure 6:
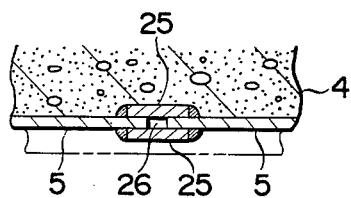
Figure 7:
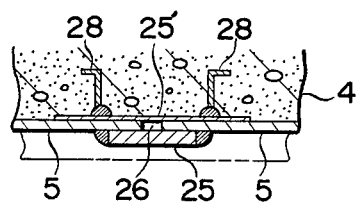
Figure 8:
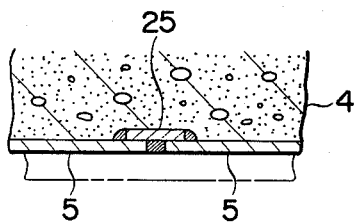

The inner wall of the manhole 13 is also lined with the lining plate 5. The lid 14 air-tightly seals the manhole 13 and blocks radiation. A catwalk 15 for inspection is constructed around the entire circumference at the upper part of the interior of the storage tank main body 1. Reference numerals 16 and 17 denote ladders. The catwalk 15 is arranged above a water level upper limit 18 of the condensate normally stored in the storage tank. Under normal conditions, an operator 19 can enter to the interior of the storage tank through the manhole 13 to walk on the catwalk 15 to perform maintenance and inspection. In an emergency, however, the condensate level may be allowed to rise to an emergency water level 20 near the inner wall of the ceiling 4 above the catwalk 15. The mounting structure of the lining plates 5 is as shown in FIGS. 3, 4 and 6. The mounting structure of the lining plates 5 at the bottom 2 and the side walls 3 will first be described with reference to FIG. 3. Embedded members 21 are integrally embedded in the bottom 2 and the side walls 3 of the storage tank main body 1 when pouring concrete. Belt-shaped backing strips 22, 22a are welded to the inner surfaces of the embedded members 21 at predetermined intervals, and the distances between the backing strips 22, 22a define leakage detection ditches 23. A plurality of the lining plates 5 are welded onto the backing strips 22, 22a. The edges of adjacent pairs of the lining plates 5 are aligned within the leakage detection ditches 23 and are welded together. Therefore, in the event that cracks form in these welded portions and a leakage results, the leaked condensate flows into these leakage detection ditches 23 to reach the leakage detection mechanism (not shown) which in turn generates an alarm signalling the leakage. The mounting structure of the lining plates 5 at the ceiling 4 is as shown in FIGS. 3, 4 and 8. The lining plates 5 at the ceiling 4 are directly adhered to the inner wall of the ceiling 4. To the undersurfaces of these lining plates 5 are welded anchor members 24 of L-shaped cross section. These anchor members 24 are embedded in the ceiling 4 to securely fix these lining plates 5. The lining plates 5 are so arranged that the edges of adjacent pairs of the lining plates 5 are spaced apart from each other by a predetermined distance as shown in FIG. 6. Belt-shaped backing strips 25 are welded on the front and rear surfaces of the portions between these edges, and the spaces enclosed by the edges of the lining plates 5 and the backing strips 25 define leakage detection ditches 26. The peripheries of the lining plates 5 of the ceiling 4 are welded to the upper edges of the lining plates 5 and the embedded members 21 of the side walls 3 as shown in FIG. 4. If there is space between the lining plate 5 of the ceiling 4 and the upper edge of the lining plate 5 of the side wall 3, the lining plate 5 of the ceiling 4 may be welded to the lining plate 5 of the side wall 3 through a corner backing strip 27, as shown in FIG. 5. Alternatively, a backing strip 25' at the undersurface of the lining plate 5 may be made thin and an anchor member 28 may be welded to the undersurface of the thin backing strip 25' to thereby adhere the thin backing strip 25' to the undersurface of the lining plate 5 by the welding heat, as shown in FIG. 7. Still alternatively, as shown in FIG. 8, the backing strips 25 may not be formed at the front surfaces of the lining plates 5, and the edges of the lining plates 5 may be welded directly. In this case, the leakage detection ditches 26 are not formed.

According to the first embodiment of the storage tank of the present invention of the construction described above, the upper limit of the condensate level is lower than the catwalk 15 so that the operator 19 may be able to walk on the catwalk 15 for performing maintenance and inspection of the storage tank as in the case of the conventional lined storage tanks. Furthermore, since the storage tank according to this first embodiment does not include the separation wall as was necessary with the conventional storage tanks, the volume efficiency may be correspondingly improved and a larger amount of condensate may be stored. Further, since the separation wall is not included, the condensate may rise to the ceiling 4 in the case of an earthquake or the like. However, since the inner surface of the ceiling 4 is also lined with the lining plates 5, and the manhole 13 and the lid 14 at the ceiling 4 are of air-tight structure and radiation blocking structure, leakage of the condensate or radiation may be effectively prevented without incorporating the separation wall. Further, in the storage tank of this embodiment, since the ceiling 4 is also lined with the lining plates 5, the condensate may be stored up to the emergency water level 20 near the ceiling 4 when highly radioactive condensate must be stored in the case of a nuclear reactor accident or the like. Although the catwalk 15 is then submerged and thus the operator 19 may not enter the storage tank, the operator would not otherwise be able to enter the storage tank when the highly radioactive condensate is stored therein. Therefore, this does not pose a particular disadvantage.

An embodiment of the method for manufacturing the storage tank according to the first embodiment will now be described. First, the embedded members 21 having backing strips 22, 22a of the bottom 2 are placed at predetermined positions while constructing a required frame and arranging reinforcement as shown in FIG. 3. Concrete is poured to complete the bottom 2 alone of the storage tank main body 1.

Secondly, the embedded members 21 having backing strips 22, 22a of the side walls 3 are arranged while the required frame is constructed and reinforcement is arranged. Then, concrete is poured to complete the side walls 3.

The construction of the required frame for formation of the ceiling 4 is then performed. In this case, an inner formwork 29 is supported by a shoring 30 inside the storage tank main body 1 to be level with the upper ends of the embedded members 21 of the side walls 3.

The lining plates 5 of the ceiling 4 to which the anchor members 24 are welded in advance are arranged on the formwork 29 so that the edges of the lining plates may be spaced apart from each other by a predetermined distance. Peripheries of the lining plates 5 of the ceiling 4 are welded to the upper edges of the embedded members 21 of the side walls 3. The backing strips 25 at the undersurface side are arranged between the edges of the lining plate 5, and the edges of the backing strips 25 are welded to the lining plates 5 as shown in FIG. 8. The backing strips 25 for the undersurface side may be welded to one of each pair of adjacent lining plates 5. Since the edges of the lining plates 5 may not be seen in this case, a marking-off line must be drawn on the undersurface of the other lining plate so that a predetermined space may be maintained between the edges of the two lining plates 5. Concrete is poured next to form the ceiling 4. Thus, the anchor members 24 are embedded inside the ceiling 4. The concrete is also in contact with the undersurfaces of the lining plates 5 so that the lining plates 5 are tightly adhered to the ceiling 4. After the concrete solidifies, the formwork 29 and the shoring 30 may be dismantled and removed from inside the storage tank. Then, as shown in FIG. 8, the edges of the lining plates 5 are welded to connect them. Next, the lining plates 5 of the side walls 3 are welded to the exposed surface of the backing strips 22 and 22a. The lining plates 5 of the ceiling 4 and of the side walls 3 are welded thereover to fillet-weld the upper edges of the lining plates 5 of the side walls 3 with the lining plates 5 of the ceiling 4 as shown in FIG. 4. In this case, when there is a space between the upper edges of the lining plates 5 of the side walls 3 and the lining plates 5 of the ceiling 4, the corner backing strips 27 may be used for welding as shown in FIG. 5. Lastly, the lining plates 5 of the bottom 2 are welded to the exposed surface of the backing strips 22 and 22a.

According to the method of the embodiment of the present invention, since the lining plates 5 are arranged on the formwork 29 of the ceiling 4 and the concrete is poured thereover, the concrete is well adhered with the lining plates 5 so that the strength of the lining plates 5 in the direction of peeling becomes great. The lining plates 5 of the ceiling 4 do not usually receive the pressure of the condensate stored in the storage tank. When the condensate stored in the storage tank is abruptly exhausted such as in the event of a coolant loss and the storage tank is placed under negative pressure, the lining plates 5 of the ceiling 4 directly receive the negative pressure, a load in the direction of peeling. The lining plates 5 of the ceiling 4 also receive a load in the direction of peeling due to their own weight. Even though the lining plates 5 of the ceiling 4 receive a greater load than that received by the lining plates 5 of the walls and bottom, they resist being peeled off, due to the great strength in the direction of peeling obtainable with the manufacturing method described above. Further, since the lining plates 5 also function as a frame, the structure of the formwork 29 may be simplified according to this method.

It is to be understood that the present invention is not limited to the particular embodiments disclosed herein.

Figure 10:
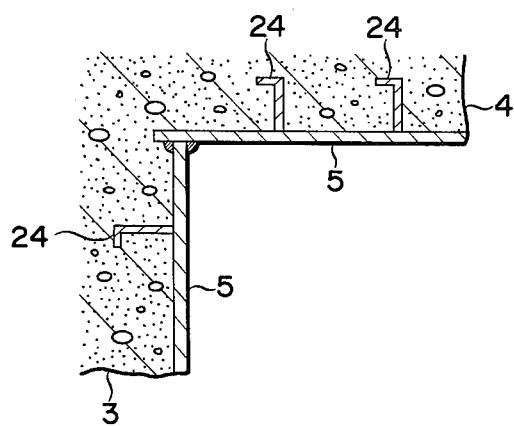
Figure 9:
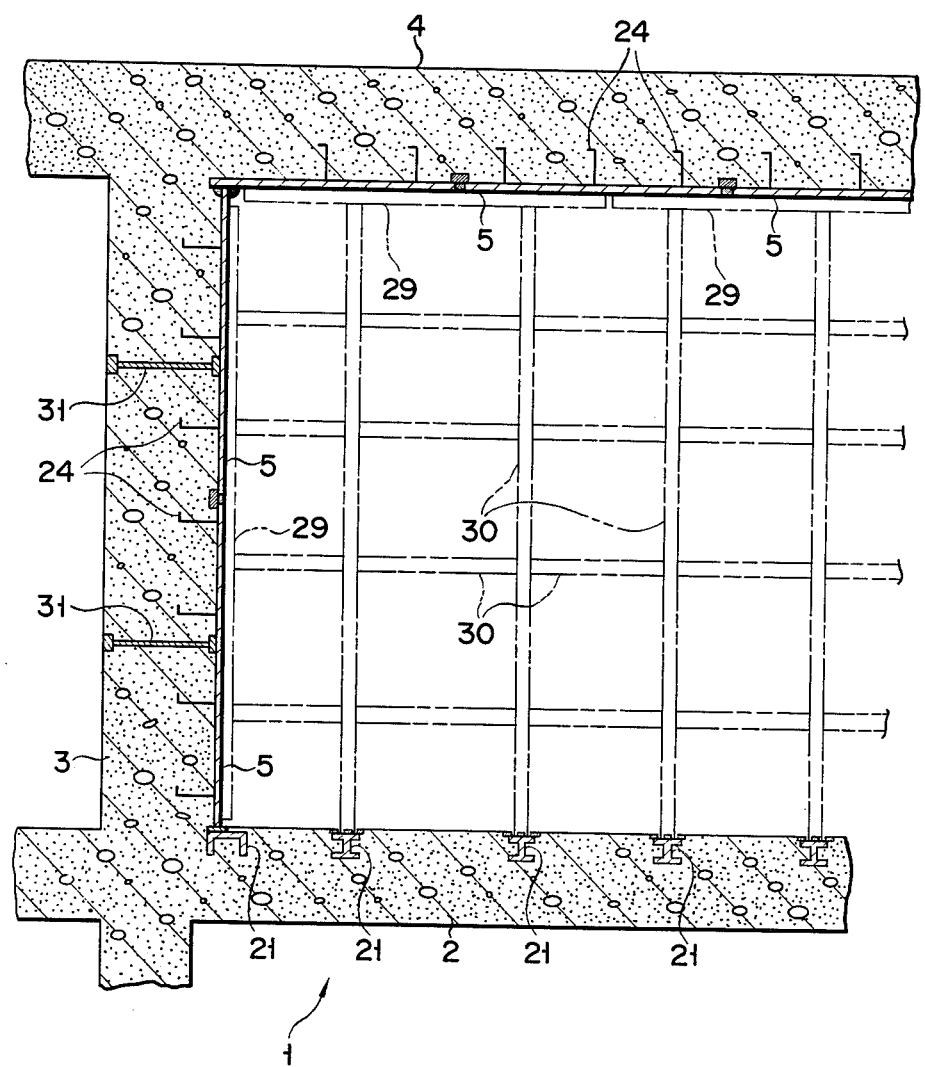

FIGS. 9 and 10 show a second embodiment of a storage tank of the present invention. According to this second embodiment, the mounting structure of the lining plates 5 of the side walls 3 is the same as that of the lining plates 5 of the ceiling 4 of the first embodiment.

The lining plates 5 of the side walls 3 and the lining plates 5 of the ceiling 4 are directly welded as shown in FIG. 10. The storage tank of the second embodiment is structurally stronger since the lining plates 5 of both the ceiling 4 and the side walls 3 are tightly adhered to the concrete of the storage tank main body 1. Excluding this different part, the similar parts of the storage tank of the second embodiment shown in FIGS. 9 and 10 are designated by the same reference numerals as in the first embodiment, and the description thereof is omitted. For manufacturing the storage tank of the second embodiment after forming the bottom 2 as shown in FIG. 9, the shoring 30 is assembled to construct the formwork 29 in correspondence with the side walls 3 and the ceiling 4. After adhering the lining plates 5 on the inner wall of the formwork 29, concrete is poured to form the side walls 3 and the ceiling 4.

The present invention is not limited to the particular embodiments described above. For example, the present invention is not limited to storage tanks for storing condensate from the nuclear power plant, but may be generally applied to storage tanks for storing other radioactive waste or the like.

What we claim is:

1. A radioactive material storage tank comprising a storage tank main body of concrete; lining plates covering the inside surfaces of a bottom, side walls, and a ceiling of said storage tank main body, anchor members being welded in advance to the lining plates covering the inside surface of the ceiling; and a manhole formed at said ceiling of said storage tank main body, which has air- and liquid-tightness and radiation blocking properties, wherein radioactive material leakage detection ditches are formed within welded seams of lining plates lined inside said bottom and said side walls of said storage tank main body, wherein each of said welded seams comprise at least two of said lining plates having edges spaced from one another to define one of said leakage detection ditches, and first and second backing strips welded to two sides of said lining plates and covering said one of said leakage detection ditches.

2. A radioactive material storage tank comprising:

a storage tank main body of concrete;

lining plates covering the inside surfaces of a bottom, side walls, and a ceiling of said storage tank main body, anchor members being welded in advance to the lining plates covering the inside surface of the ceiling; and a manhole formed at said ceiling of said storage tank main body, which has air and liquid-tightness and radiation blocking properties, wherein radioactive material leakage detection ditches are formed within welded seams of lining plates lined inside said bottom, said side walls and said ceiling of said storage tank main body, wherein each of said welded seams comprises at least two of said lining plates having edges spaced from one another to define one of said leakage detection ditches, and first and second backing strips welded to two sides of said lining plates and covering said one of said leakage detection ditches.

* * * * *